FIG. 1

INVENTOR.
HERBERT C. RHODES
BY
Otto Moeller
Attorney

INVENTOR.
HERBERT C. RHODES

Aug. 5, 1952 — H. C. RHODES — 2,605,723
MACHINE FOR REVERSELY SHEETING DOUGH
Filed Oct. 13, 1949 — 5 Sheets-Sheet 5

INVENTOR.
HERBERT C. RHODES
BY Otto Maeller
Attorney

Patented Aug. 5, 1952

2,605,723

UNITED STATES PATENT OFFICE 2,605,723

MACHINE FOR REVERSELY SHEETING DOUGH

Herbert Cecil Rhodes, Portland, Oreg., assignor to Read Standard Corporation, a corporation of Delaware Application October 13, 1949, Serial No. 121,215

11 Claims. (Cl. 107—12)

This invention relates broadly to dough working apparatus and more specifically to a machine for reversely sheeting a piece of dough.

This invention is a continuation-in-part of my co-pending application filed August 16, 1948, Serial Number 44,492 now abandoned.

Heretofore dough working machines employed for sheeting a mass of dough, preparatory to curling the dough sheet for delivery to a baking pan, have so compressed the dough as to form a dough sheet embodying a dry end. Thus during the curling operation the dry end of the dough sheet is the first part of the sheet to be coiled, so that the resultant roll of dough upon being baked is found to produce a loaf of bread containing what is known in the trade as a dry core. This dry core not only extends throughout the center of the loaf from end to end, but also is found to be of a rather coarse texture.

In machines of the type commonly employed in present day bakeries a mass of dough is delivered to a plurality of sets of compression rollers. The first set of rollers are usually spaced further apart than the succeeding sets, so that the mass of dough is compressed into sheet form by the first set of rollers, while the subsequent sets of rollers tend to reduce the thickness of said sheet as it is advanced through the machine. During this series of compression steps the same end of the dough sheet is initially engaged by each set of rollers, so that the moisture contained in the dough sheet is continuously being forced from the forward or leading end portion towards the rear or trailing end portion of the dough sheet. Thus during the curling or coiling operation the forward or leading edge of the dough sheet which is the end from which the moisture has been removed, is curled first and the remaining portion of the sheet is subsequently coiled about this forward end. As the result of such an operation a roll of dough when deposited in a baking pan is formed with a dry inner edge which produces a dry core in the finished loaf of bread.

The present invention is designed to overcome the aforementioned shortcomings of the present day commercial dough working machines. The subject matter of the present invention is directed to a dough working machine wherein a sheet of dough is inverted end for end during its course of travel through the compression or sheeting rollers so as to obtain a uniform distribution of moisture throughout the dough sheet prior to the coiling of said sheet.

One of the objects of the present invention is to provide a dough working machine having a plurality of sets of rollers for compressing a mass of dough into an elongated sheet.

Another object of the present invention is to provide adjusting means on said sets of rollers wherein the thickness of the elongated dough sheet may be varied for breaking down the large gas cells in the dough sheet and thereby secure an evenness of cellular structure and a uniformity of fine grain structure.

Another object of the present invention is to provide sets of adjustable rollers adapted to compress a mass of dough into elongated sheets wherein the moisture content of each dough sheet is substantially concentrated in the rear portion of the dough sheet.

Another object is to provide a member co-acting with a set of said compression rollers for receiving and inverting end for end the elongated sheets of dough.

A further object is to provide a final set of rollers adapted to receive the inverted sheets of dough for redistributing the moisture content of the dough sheet.

A still further object of the present invention is to provide a limit stop member associated with the inverting member to insure the delivery of the inverted dough sheet to a final set of rollers for redistributing the moisture content of the dough sheet.

Other objects and advantages more or less ancillary to the foregoing and the manner in which all the various objects are realized will appear in the following description, which considered with the accompanying drawings, sets forth the preferred embodiment of the invention.

Referring to the drawings, wherein the preferred embodiment of the invention is illustrated.

Figures 5, 7:
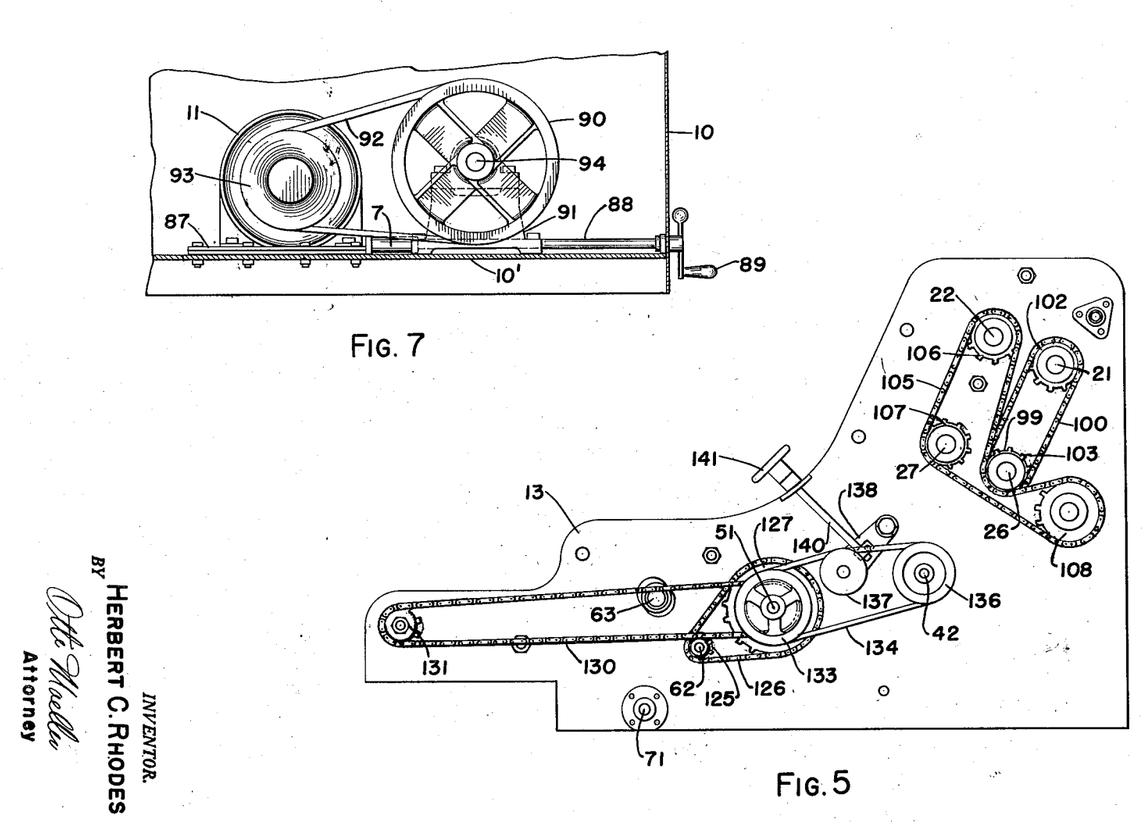
Figure 5 is an elevational view of one side of the machine, showing the drive mechanism for the various rollers.
Figure 7 is a side elevational view of a section of the base of the machine showing the motor and main pulley for driving the various rollers.
Figures 6, 9:
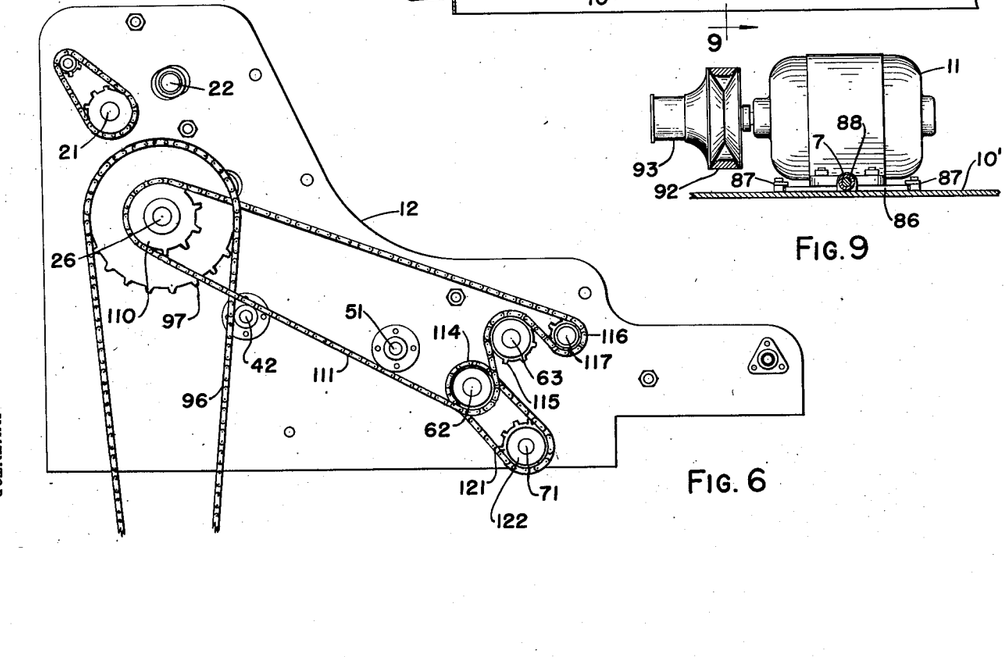
Figure 6 is a side elevational view similar to Figure 5, but taken from the opposite side of the machine and showing additional driving means of the machine.
Figure 9 is a sectional view showing the motor mounted on an adjustable base for varying the speed of the main driving pulley.
Figure 8:
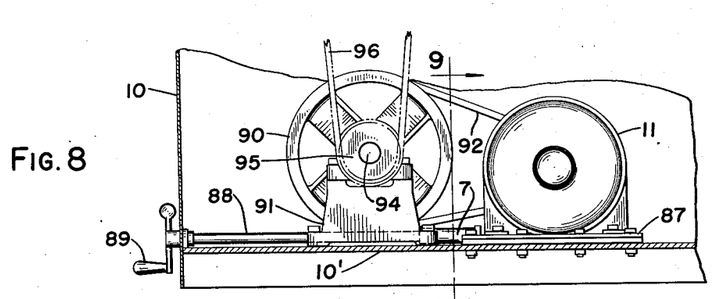
Figure 8 is a side elevational view similar to Figure 7, but taken from the opposite side of the machine and showing adjustable means for varying the speed of the main driving pulley.

Referring to the drawings, there is shown a dough working machine embodying a base 10, Figures 7 and 8, having a platform 10' upon which is supported a motor 11, of a conventional type, for driving the various compressing or sheeting rollers of the present machine. A pair of side plates 12 and 13, Figures 5 and 6, are mounted on the base member 10 in spaced parallel relation. The side plates 12 and 13 have secured to their inner faces, adjacent the rear top portion thereof, a pair of brackets 15, Figure 2, for supporting a rotatable shaft 16. A conveyor belt 17 engages a roller mounted on shaft 16 and extends over a second roller and shaft, not shown.

The conveyor belt 17 is so positioned as to receive at one end thereof a plurality of uniformly spaced masses of dough from a conventional dough dividing machine and to deliver said masses of dough to a pair of compressing or sheeting rollers. The sheeting rollers 18 and 19 are mounted on shafts 21 and 22 adjacent the delivery end of conveyor 17 and intermediate the side plate members 12 and 13. A second pair of compressing or sheeting rollers 24 and 25 are mounted on shafts 26 and 27 intermediate the side plate members 12 and 13. The rollers 24 and 25 are positioned below and slightly forward of the sheeting rollers 18 and 19 so as to define a downwardly sloping passageway for the sheets of dough.

The shafts 21 and 26, which carry the rollers 18 and 24, have their end portions projecting through suitable apertures formed in the side plates 12 and 13. The shafts 22 and 27, upon which the rollers 19 and 25 are mounted, each have their ends supported in respective frame members 28, Figure 2, which frame members are pivotally mounted on the inner faces of the side members 12 and 13 by means of pins 30. The frame members 28 are retained in spaced relation by rods 31 which are mounted in the forward portion of said frame members.

Figure 3:
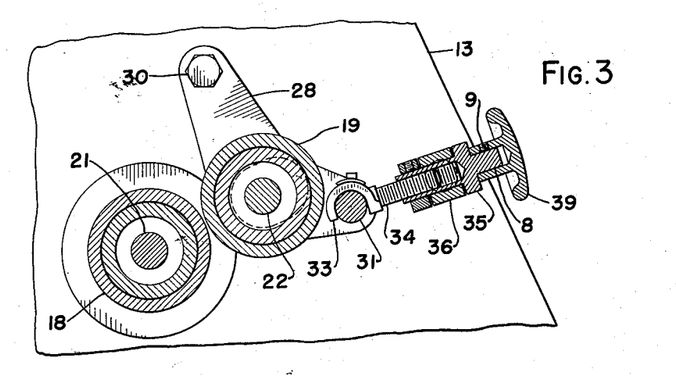
Figures 3 is a fragmentary sectional view taken along the lines 3—3 of Figure 1 and showing the sheeting or compressing rollers in spaced relation and the adjusting mechanism for said rollers.
Figure 4:
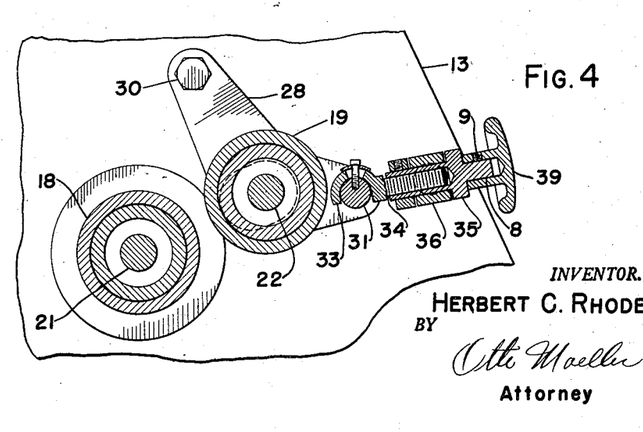
Figure 4 is a fragmentary sectional view taken along the line 4—4 of Figure 1 and showing the compression or sheeting rollers in an adjusted position.

As shown, in Figures 3 and 4, the rod 31 has mounted thereon the hood end 33 of an adjusting screw 34, with the other end of the screw 34 disposed in threaded engagement with a sleeve 35. The sleeve 35 is carried by a suitable housing 36 which is supported on a transverse shaft 38, which shaft is secured to the inner face of the side plate members 12 and 13. A handwheel 39 is secured by means of a set screw 9 on the shank 8 of the sleeve 35 for advancing or retracting the screw 34. The movement of the screw 34 is imparted to the frame members 28 by the rods 31 which movement causes the frame members to pivot about the pins 30 and thus move the shafts 22 and 27 and rollers 19 and 25 toward or away from the rollers 18 and 24. As shown in dotted lines in Figures 3 and 4 the end portions of shafts 22 and 27 project through elongated openings formed in the side plate members 12 and 13.

A drum 41 carried by a shaft 42 is positioned beneath and slightly forward of the compressing or sheeting rollers 24 and 25 with a portion of the peripheral surface of said drum projecting into the downwardly sloping passageway as defined by the rollers 18, 19, 24 and 25. The ends of the shaft 42 extend through suitable apertures formed in the side plate members 12 and 13. The rotatable drum 41 has formed on its peripheral face a plurality of spaced annular serrated bands 44, Figure 1, to insure proper engagement of the elongated dough sheets with the drum and also to prevent any slippage occurring between said sheets and the surface of the drum. As shown in Figure 2, guide plates 46 are disposed beneath the rollers 18 and 19, and 24 and 25, respectively, to facilitate the delivery of the dough sheets from one set of sheeting rollers to the second set of sheeting rollers and also to the rotating drum 41. A second drum 50 mounted on a shaft 51, between the side plate members 12 and 13, is positioned slightly below and forward of the drum 41. The drum 50 is of a smaller diameter than the drum 41 and is adapted to rotate at a constant rate of speed, while the drum 41 may be adjusted to rotate at different peripheral speeds relative to the peripheral speed of drum 50. The drums 41 and 50 have the same direction of rotation.

A limit stop plate 52 positioned beneath and intermediate the drums 41 and 50 is mounted upon a rod 53 which is secured to the inner faces of the side plate members 12 and 13. The limit stop plate 52 is adapted to receive the forward or leading edge of an elongated dough sheet as it leaves the drum 41 so as to prevent said sheet from falling between the two drums 41 and 50. The rotative speed of drum 41 is usually greater than the speed of the sheeting rollers 24 and 25 and drum 50, thus as the elongated dough sheet is delivered to and carried by drum 41 the forward or leading edge of the sheet, upon leaving the surface of the drum, is adapted to engage the limit stop plate 52. At approximately the moment the leading edge of the dough sheet strikes the limit stop plate 52 the trailing or rear end portion of the dough sheet is flipped, thrown or inverted from the surface of drum 41 to the surface of drum 50. The rotation of drum 50 causes the dough sheet to be moved forward to a final set of sheeting rollers so that the end of the dough sheet engaging plate 52 is drawn therefrom. The peripheral speed of drum 41 not only determines the rate at which the dough sheets will be flipped to drum 50 but also the degree of engagement of the dough sheet with the plate 52. That is if drum 41 is being rotated at a slow rate of speed the leading edge of the dough sheet will have a very pronounced engagement with the plate 52 before the trailing end of the sheet is inverted onto drum 50, while if drum 41 is rotating at a high rate of speed the engagement between the end of the dough sheet and the plate 52 will be very slight and in some instances there will be no engagement at all.

The peripheral surface of the drum 50 is provided with a plurality of spaced angular serrated bands 54 which are adapted to insure the engagement of the elongated dough sheet with the surface of the drum and depending on the consistency of the dough to preclude slipping or sticking of the dough sheet on the drum's surface. A plurality of fingers 56 carried by a rod 57 are arranged to engage the peripheral surface of the drum 50 between the annular serrated bands 54. The rod 57 is secured to the inner faces of the side frame members 12 and 13. The fingers 56 are designed to remove the elongated dough sheet from the drum 50 and also define a guide means for delivering the dough sheet from the drum 50 to a final set of compressing or sheeting rollers. The final set of compressing or sheeting rollers 60 and 61 are mounted on shafts 62 and 63 and are positioned intermediate the side frame members 12 and 13 adjacent the rotating drum 50. The sheeting roll 60 is mounted on the shaft 62 with the end portions of the shaft projecting through the side frame members in the same manner as shafts 21 and 26. The sheeting roll 61 and shaft 63 are supported in the frame members 65 in the same manner as rolls 19 and 25 are supported in frame members 28. Furthermore sheeting roll 61 is provided with adjusting means 67 of the same type as employed in conjunction with rolls 19 and 25.

The sheeting rolls 18, 19, 24, 25, 60 and 61 may be formed of any material suitable for compressing a mass of dough. It has been found that rollers formed of a plastic material, such as Teflon, provide not only an extremely hard surface which is suitable for compressing or sheeting a mass of dough but also a surface to which the dough will not adhere.

A roller 70, Figure 2, mounted on a shaft 71 forwardly of the compressing rollers 60 and 61 has an endless conveyor belt 72 entrained thereover. A guide plate 73 is interposed between the compressing rollers 60 and 61 and the top surface of the conveyor belt 72 for delivering the elongated sheets of dough from said compression rollers to the conveyor.

A curling apron or belt 75 is supported on rollers 76 and 77 and 78 intermediate the side frame members 12 and 13. The curling apron 75 is positioned above the upper run of the conveyor 72 and is adapted to travel in a direction opposite to the direction of travel of the conveyor 72. The lower run of the curling belt 75 is provided with a certain amount of slack to facilitate the curling or coiling of a sheet of dough. Thus upon the delivery of an elongated sheet of dough to the conveyor 72 the sheet will be engaged by the lower run of the curling belt 75 and the dough sheet will be curled into a roll with the leading end of the dough sheet being the inner edge or core of the roll. The conveyor 72 moves the roll of dough under the curling apron 75 and delivers the rolled dough to a pressure board, not shown, from where it will be conveyed to the baking pans.

Figure 10:
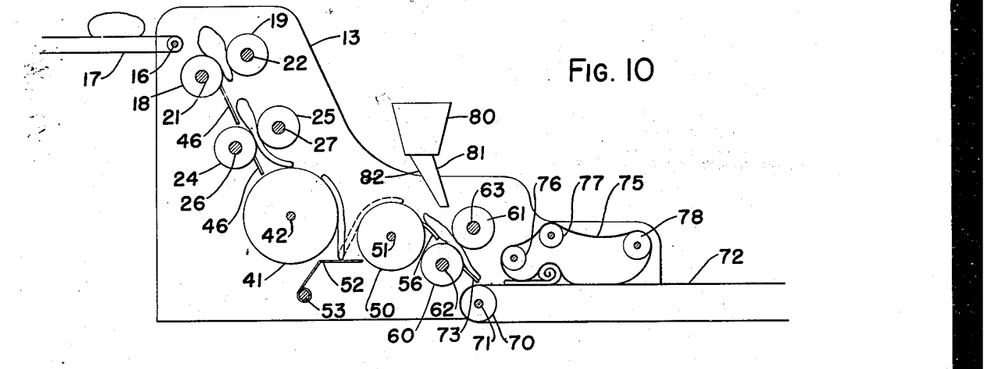
Figure 10 is a side elevational view showing diagrammatically the course of the dough pieces passing through the machine and the operations performed thereon.

As shown in Figure 10, a flour sifter 80 is mounted on the side frame members 12 and 13 above and rearward of the compressing rollers 60 and 61. A downwardly sloping chute 81 is secured to the bottom of the sifter for delivering flour to the rollers 60 and 61. The guide chute 81 is formed with a downwardly tapered rear surface 82. The rear face 82 of the chute 81 serves as an upper guide means for the elongated dough sheet as it is being delivered from drum 50 to the sheeting rollers 60 and 61. That is, if the drum 50 is being rotated at a relatively high rate of speed the trailing edge of the dough sheet, during the delivery to the rollers 60 and 61, may be thrown with such force that said trailing edge of the sheet will strike the face 82 of the chute 81. As a result of having the face 82 of the chute 81 tapered downwardly any pieces of dough striking this surface will be directed downwardly between the rollers 60 and 61.

The various sheeting rollers and rotating drums as well as the conveyor 72 and curling belt 75 are all driven from a single source of power, namely the motor 11. The motor 11 is mounted on a plate 86 which is slidable in guides 87, Figure 9, that are affixed to the platform 10'. A shaft 88 has a handle 89 on one end thereof and is threaded at its other end in a bushing 7 which is secured to the plate 86, whereby upon turning the handle 89 the motor 11 and plate 86 move in the guides 87. The motor 11, Figure 7, is provided with a variable drive pulley 93, of a type commonly known as a Lewellyn variable speed drive pulley. A main driving pulley 90, mounted on one end of a shaft 94 is connected to the variable drive pulley 93 by a belt 92, thus, upon the rotation of the handle 89 of the shaft 88 the motor 11 and plate 86 are moved in the guides 87 for varying the speed of the pulley 90.

The shaft 94 which is supported on suitable stanchions 91 on the platform 10' has a driving sprocket 95 mounted on the free end thereof. A sprocket chain 96 engages the sprocket 95 for driving a second sprocket 97 which is mounted on the end of shaft 26 that extends through the side frame member 12. The opposite end of shaft 26, which extends through the side member 13, has a sprocket wheel 99 mounted thereon over which is trained a sprocket chain 100 that in turn engages a sprocket 102 mounted on the end of shaft 21 which extends through the side frame member 13. A second sprocket wheel 103 is also mounted on the end of shaft 26 intermediate the side frame member 13 and sprocket 99. A sprocket chain 105 is trained over sprocket 103 and is adapted to engage a sprocket wheel 106 mounted on the end of shaft 22 as well as a sprocket wheel 107 mounted on the end of shaft 27. The sprocket chain 105 is also entrained over an idler sprocket wheel 108 mounted on a stub shaft 109 which is supported on the side frame member 13, as shown in Figure 5. Thus, with the driving mechanism as shown the variable drive pulley 93 mounted on the motor 11 will rotate pulley 90 by means of belt 92. The pulley 90 will in turn drive sprocket wheel 97 through shaft 94, sprocket wheel 95 and chain 96. The sprocket wheel 97 mounted on shaft 26 will rotatably drive sheeting roller 24 while shaft 26 will drive sheeting rollers 18, 19 and 25 through sprocket wheels 102, 103, 106 and 107 and chains 100 and 105. The sheeting rollers 18, 19, 24 and 25 are rotatably driven as a unit at a constant rate of speed and to increase or decrease this rate of speed it is necessary to vary the position of the motor 11. The adjustment of the motor 11 and plate 86 by shaft 88 causes the belt 92 to shift on the variable speed pulley 93 thereby either increasing or decreasing the rotative speed of shaft 94 and the driving sprocket 95.

Figure 1:
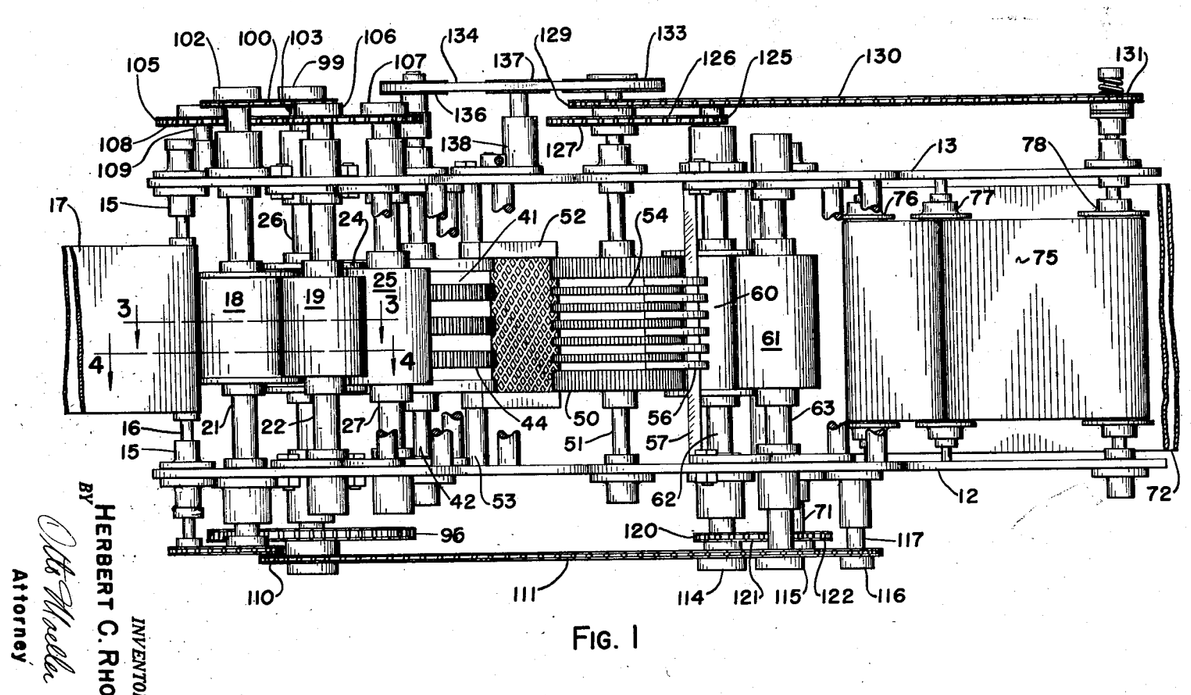
Figure 1 is a plan view of the machine constituting the subject matter of the present invention.
Figure 2:
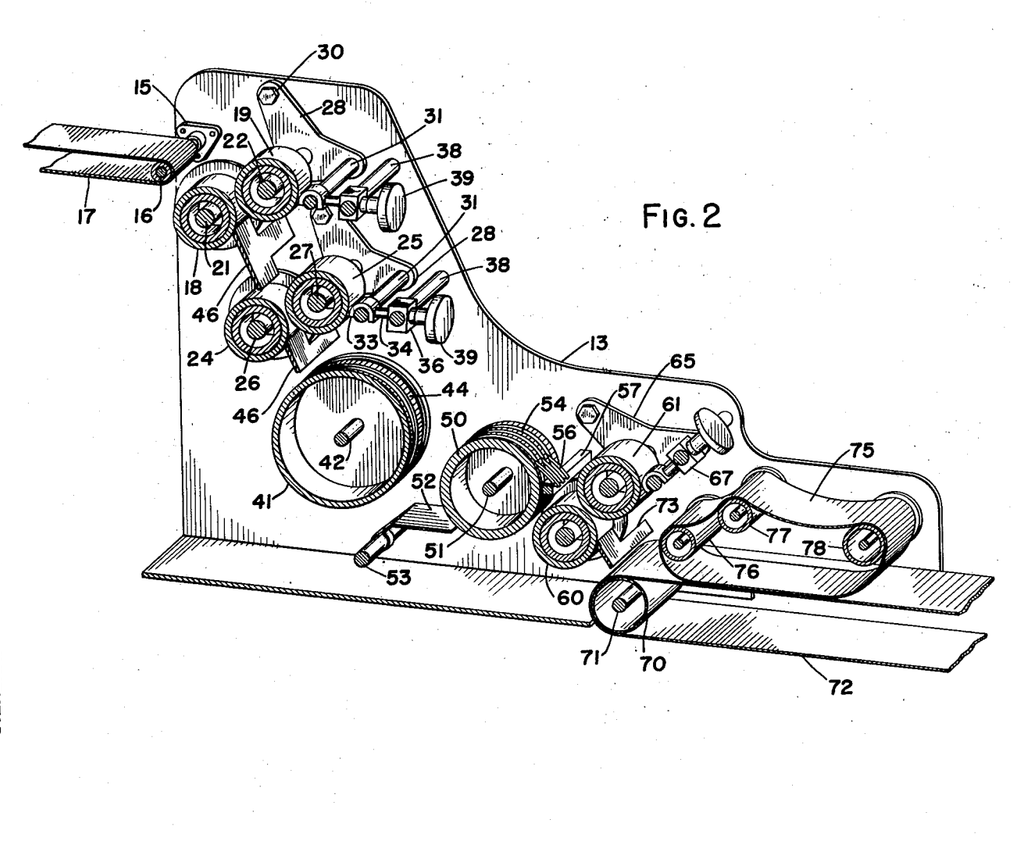
Figure 2 is a perspective view of a section of the present machine with one side of the machine being removed.

The shaft 26, Figure 1, has mounted on the end thereof outwardly of the sprocket 97, a second sprocket wheel 110 which is engaged by a sprocket chain 111. The chain 111 is entrained over sprocket wheels 114 and 115 which are mounted on the portions of shafts 62 and 63, respectively, that extend through the side frame member 12. In addition the sprocket chain 111 engages an idler gear 116 mounted on a stub shaft 117 which is supported on the side frame member 12. A second sprocket wheel 120 is also mounted on the shaft 62 intermediate the frame member 12 and sprocket 114 and passing around the wheel 120 is a sprocket chain 121 which engages a sprocket wheel 122 secured to the outer end of shaft 71 for driving the roller 70 and conveyor 72. Thus a constant speed of rotation is imparted to the compressing rollers 60 and 61 and conveyor 72 by the sprocket wheels 114 and 115 and 122 and the sprocket chains 111 and 121 in as much as the sprocket chain 111 is driven by the main sprocket wheel 95 and chain 96.

The portion of the shaft 62 which projects beyond the side frame member 13 has a sprocket 125, Figures 1 and 5, affixed thereto over which is passed a sprocket chain 126. The sprocket chain 126 engages a sprocket wheel 127 mounted on the outer end of shaft 51 which shaft carries the rotating drum 50. There is also secured on shaft 51 outwardly of sprocket wheel 127 a second sprocket wheel 129 which is engaged by a sprocket chain 130. The chain 130 passes over a sprocket wheel 131 mounted on the end of the shaft which supports the roller 78 of the curling apron 75. Thus, the rotating drum 50 and curling apron 75 are driven at the same constant rate of speed as the compressing rollers and the conveyor 72.

The rotatable shaft 51 has secured to the outer end thereof a pulley 133 over which passes a belt 134. The belt 134 is adapted to engage a variable speed pulley 136 mounted on the end portion of the shaft 42 that extends through the side frame member 13. An idler pulley 137, Figure 5, carried by arm 138 pivotally mounted on the side frame member 13 is adapted to engage the belt 134. An adjusting mechanism 140 is mounted on the bracket 138 and is provided with a hand wheel 141 for varying the position of the idler pulley 137 and thereby increasing or decreasing the speed of the pulley 136 and the shaft 42 and rotatable drum 41.

The pulley 133 which is mounted on the end of shaft 51 is driven at the same constant rate of speed as the sheeting rolls and curling apron 75, however, the speed of the rotating drum 41 is capable of being changed through the variable speed pulley 136 and the adjusting mechanism 140 associated with the idler pulley 137. The speed of the rotating drum 41 which effects the flipping or inverting of the elongated dough sheets must be such as to insure that the dough sheets will be inverted as the trailing edge of each elongated sheet leaves the compressing rollers 24 and 25 and engages the peripheral surface of the rotating drum 41. That is if the machine, through adjustment of the motor 11 with respect to the pulley 90, has been set up to operate at a constant speed to process a predetermined number of pieces of dough per minute then the rotating or reversing drum 41 through its adjusting mechanism, is set to operate at such a rate of speed as to insure that its surface speed is sufficient to effect the flipping or inverting of the elongated dough sheets as they are received from the compressing rolls 24 and 25. In the event that it is desired to increase the number of dough pieces per minute of time that are to be passed through the machine then the speed of the machine should be increased by adjusting the motor 11 through the handle 89 and consequently changing the drive of pulley 93. Increasing the speed of the machine results in a higher speed of the drum 41, so that it may be necessary to decrease the speed of the reversing drum 41 through the hand wheel adjustment 141. The exact difference in speed between the reversing drum 41 and the several sets of compressing or sheeting rollers must be determined by the operator of the machine and is in a large measure dependent upon the number of dough pieces per minute which are intended to be passed through the machine.

In the operation of the machine, of the present invention, the compressing or sheeting rollers 18, 19, 24, 25, 60 and 61 as well as the rotating drum 50 and conveyor 72 and curling belt 75 are driven at a constant rate of speed by the motor 11 through the pulley 90 and main sprocket wheel 95. With the spacing of the sheeting rollers having been preset by means of the adjusting mechanism 36 and 67 a mass of dough, Figure 10, is delivered by the conveyor 17 to the first set of sheeting rollers 18 and 19. As the mass of dough is delivered from the conveyor 17 the rollers 18 and 19 compress the dough into an elongated sheet which upon being ejected from said rollers passes over the upper guide plate 46 to the rollers 24 and 25 where it is further compressed. As the elongated dough sheet emerges from the rollers 24 and 25 it is directed onto the surface of drum 41 by the lower guide plate 46. It has been found that the first set of sheeting rollers should be spaced further apart than the second set of rollers, while the spacing between the rollers of the final set should be less than the spacing between the intermediate set of rollers. As a result of progressively decreasing the spacing between the various sets of rollers there is imparted to the elongated dough sheet, as it passes through the machine, an increasing compressing or sheeting action which tends to break down the large gas cells formed in the dough and thereby produce a dough sheet having a relatively even cellular structure.

Upon a dough mass being delivered to the rollers 18 and 19 the portion of the dough first engaged by the rollers is compressed into sheet form. The moisture contained in this portion of the dough is forced towards the rear of the dough mass and this action continues until the mass of uncompressed dough has been gradually compressed to the desired thickness. Thus the last portion of the dough mass to pass between the rollers contains a greater amount of moisture than does the portion of the dough first engaged by the rollers. With the spacing between rollers 24 and 25 being less than the spacing between rollers 18 and 19 the elongated dough sheet is given an additional compressing action as it passes between the second set of sheeting rollers. The portion of the dough sheet first engaged by the rollers 24 and 25 is the same portion that is first engaged by the rollers 18 and 19 consequently the additional compressing action imparted to the dough sheet by the second set of rollers tends to force the moisture contained in the forward or leading portion of the sheet towards the rear or trailing portion of the dough sheet. Thus, as the elongated dough sheet is discharged from the second set of sheeting rollers the leading end portion of the sheet does not contain the amount or degree of moisture that is found in the rear or trailing portion. The reason for this being that as the dough is fed between the compressing rollers the spacing between the rollers is such that the dough tends to back up and during this so called backing up operation the moisture content of the dough is substantially concentrated in the rear or trailing portion of the sheet.

As shown in Figure 10 the leading end portion of the dough sheet, which is the portion from which the moisture has been substantially removed, is the first to engage the rotating or inverting drum 41. The forward or leading edge of the dough sheet is carried around by the drum 41 to approximately the point where a horizontal plane passing through the shaft 42 would intersect the periphery of drum 41 and at approximately this point the leading edge of the dough sheet leaves the surface of drum 41 and travels in substantially a plane perpendicular to the limit stop member 52. Prior to the time at which the leading edge of the dough sheet engages the limit stop plate 52 the rear or trailing end portion of the dough sheet passes through the compressing rollers 24 and 25 and engages the peripheral surface of the rotating drum 41. Due to the fact that drum 41 is rotating at a greater rate of speed than the remaining portion of the machine the trailing end of the dough sheet is thrown or inverted from the drum 41 to the rotating drum 50. At the time of throwing or inverting the trailing end portion of the dough sheet from the drum 41 to the surface of drum 50 the leading end portion of the dough sheet engages or just about engages the limit stop plate 52. After inverting or throwing the dough sheet onto the drum 50 it is delivered by the drum to the final set of compressing rollers 60 and 61.

The portion of the elongated dough sheet which is first engaged by the sheeting rolls 60 and 61 is the portion of the sheet which was the last to engage the drum 41. The new leading end portion of the dough sheet is the portion wherein the moisture content of the sheet is substantially concentrated due to the prior sheeting actions. Thus as the dough sheet passes between the sheeting rollers 60 and 61 a portion of the moisture contained in the leading end portion is forced to the trailing end portion which action produces a relatively uniform redistribution of the moisture content of the sheet. Thus, by redistributing the moisture contained in the dough sheet the dry end of the sheet is entirely eliminated. The dough sheet upon being ejected from the sheeting rolls 60 and 61 passes over the guide plate 73 to the top surface of the conveyor 72 where it is carried under the curling belt 75 and subsequently coiled or curled into a roll for delivery to a baking pan.

In the flipping or inverting of the dough sheet from the drum 41 to the drum 50 the peripheral speed of drum 41 must be greater than the peripheral speed of the compressing rollers and also drum 50. The stop plate 52 positioned between the drums 41 and 50 determines the distance that the leading edge of the dough strip will be able to travel after it leaves drum 41 before the trailing end portion of the sheet is inverted or thrown onto the drum 50. The momentary engagement of the leading end portion of the dough sheet with the stop plate 52 tends to square this end of the dough sheet. Thus, as the sheet of dough passes through the final set of sheeting rollers the trailing edge of the dough sheet, which was formerly the leading edge, is disposed in substantially squared relation with the side portions of the dough sheet and consequently when the dough sheet is rolled or curled by the belt 75 the outer or final edge of the rolled dough is disposed in substantially a straight line.

I claim:

1. A dough sheeting machine comprising a plurality of rotating drums and sets of sheeting rollers arranged with their axes in parallel relation, one set of said rollers adapted to engage and compress a mass of dough to form an elongated sheet, a rotatable drum positioned beneath said one set of rollers to receive the elongated sheet, a second rotatable drum having its upper peripheral surface at a level below the upper peripheral surface of said first mentioned drum, said drums arranged to rotate in the same direction with their juxtaposed peripheral portions moving counter to one another, said arrangement providing for flipping the trailing portion of the elongated sheet from the peripheral surface of the first mentioned drum to that of the second mentioned drum and another set of said rollers arranged forward of said second mentioned drum to receive said elongated sheet from said second mentioned drum.

2. A dough sheeting machine comprising a plurality of rotating drums and sets of sheeting rollers defining a downwardly and forwardly sloping passageway, said drums and sets of rollers having their axes arranged in parallel relation, an initial set of said rollers engageable with and compressing a mass of dough to form an elongated sheet, a rotatable drum positioned beneath said initial set of rollers with its upper peripheral surface disposed below and across said passageway to receive the elongated sheet, a second rotatable drum having its axis arranged forward of and at a level below the axis of the first mentioned drum with its upper peripheral surface disposed below and across said passageway, said drums arranged to rotate in the same direction with their juxtaposed peripheral portions moving counter to one another, said arrangement providing for flipping of the trailing portion of the elongated sheet from the upper peripheral surface of the first mentioned drum to the upper peripheral surface of the second mentioned drum, a final set of rollers positioned forwardly of said second mentioned drum for receiving said elongated sheet from said second mentioned drum, said final set of rollers having their adjacent peripheral dough engaging surfaces disposed at a level below the upper peripheral surface of said second mentioned drum.

3. A dough sheeting machine comprising a plurality of rotating members and sets of sheeting rollers defining a continuous path, said members and sets of rollers having their axes arranged in parallel relation, said sets of rollers arranged to rotate at a constant relative peripheral speed, one set of said rollers engageable with and compressing a mass of dough to form an elongated sheet, a rotatable member positioned beneath said one set of rollers to receive the elongated sheet, a second rotatable member having its upper peripheral surface at a level below the upper peripheral surface of said first mentioned member, said members arranged to rotate in the same direction with their juxtaposed peripheral portions moving counter to one another, said arrangement providing for flipping the trailing portion of the elongated sheet from the peripheral surface of the first mentioned member to that of the second mentioned member, another set of said rollers arranged to receive said elongated sheet from the second mentioned rotating member with the previously trailing end being the portion first engaged by said rollers, one of said rotating members having a constant relative peripheral speed with respect to the peripheral speed of said sets of rollers.

4. A dough sheeting machine as described in claim 1 including a power unit and driving means adapted to rotate said sets of rollers and one of said drums at a constant relative peripheral speed.

5. A dough sheeting machine comprising a plurality of rotating drums and sets of sheeting rollers arranged with their axes in parallel relation, one set of said rollers adapted to engage and compress a mass of dough to form an elongated sheet, a rotatable drum positioned beneath said one set of rollers to receive the elongated sheet, a second rotatable drum having its upper peripheral surface at a level below the upper peripheral surface of said first mentioned drum to receive the elongated sheet from the first mentioned drum, said drums arranged to rotate in the same direction with their juxtaposed peripheral portions moving counter to one another, another set of said rollers arranged forward of said second mentioned drum to receive said elongated sheet from said second mentioned drum, a power unit, driving mechanism connecting said power unit with said sets of rollers and said drums for rotating said rollers and drums at a constant relative peripheral speed and means associated with the first mentioned drum for varying the peripheral speed of the first mentioned drum with respect to the peripheral speed of the second mentioned drum for flipping the trailing portion of the elongated sheet from the peripheral surface of the first mentioned drum to that of the second mentioned drum.

6. A dough sheeting machine as described in claim 1 including a power unit, a pulley rotatably driven by said unit, driving mechanism connecting said pulley with said sets of rollers and said drums for rotating said rollers and drums at a constant relative peripheral speed, an adjusting means associated with said power unit for varying the speed of said pulley and said sets of rollers and said drums.

7. A dough sheeting machine as described in claim 1 and including said first mentioned drum being larger than said second mentioned drum and said first mentioned drum having a greater peripheral speed than the second mentioned drum.

8. A dough sheeting machine as described in claim 2 including means interposed between said drums and engageable with the portion of said dough sheet first to engage the first mentioned drum to limit the movement of said dough sheet.

9. A dough sheeting machine as described in claim 1 including a plurality of spaced annular serrated bands formed on the peripheral surface of said first mentioned drum, said bands engaging the elongated dough sheet to retain said sheet on said first mentioned drum in proper alignment with the second mentioned drum and a plate interposed between said drums for limiting the travel of the elongated sheet between said drums.

10. A dough sheeting machine comprising a plurality of rotating drums and sets of sheeting rollers arranged with their axes in parallel relation, an initial set of said rollers adapted to engage and compress a mass of dough to form an elongated sheet having a leading and a trailing end portion, a rotatable drum positioned beneath and slightly forward of said initial set of rollers, a plurality of spaced annular serrated bands formed on the peripheral surface of said drum for receiving the elongated dough sheet from said initial set of rollers with the trailing end portion of the sheet being the last to engage said bands, a second rotatable drum having a plurality of spaced annular serrated bands formed on the peripheral surface thereof, said second mentioned drum having its upper peripheral surface at a level below the upper peripheral surface of said first mentioned drum, said drums arranged to rotate in the same direction with their juxtaposed peripheral portions moving counter to one another, said first mentioned drum arranged to rotate at a higher rate of speed than the second mentioned drum for throwing the elongated dough sheet from said first mentioned drum onto said second mentioned drum with the trailing end portion of said sheet being the first to engage the second mentioned drum, a limit stop plate interposed between said drums for engaging the leading end of said elongated dough sheet to square up said end of the dough sheet contemporaneous with the throwing of the trailing end portion of said sheet from said first mentioned drum onto said second mentioned drum, a final set of said rollers positioned slightly forward of said second mentioned drum to receive said elongated sheet from said second mentioned drum and compress said sheet in a direction opposed to the direction of compression by the initial set of rollers and adjusting means associated with one roller of each of said sets of rollers for varying the spacing between the rollers of each set.

11. A dough sheeting machine as described in claim 10 including a plurality of spaced fingers interposed between said final set of rollers and the second mentioned drum with the ends of said fingers engaging the surface of said drum intermediate said serrated bands, said fingers preventing the dough from adhering to said drum and constituting a guideway for delivering the dough sheet from said second mentioned drum to the final set of rollers.

HERBERT CECIL RHODES.

REFERENCES CITED

The following references are of record in the file of this patent:

UNITED STATES PATENTS

| Number | Name | Date |
|---|---|---|
| 2,373,012 | Burdett et al. | Apr. 3, 1945 |
| 2,431,074 | Palmer | Nov. 18, 1947 |
| 2,479,864 | Rhodes | Aug. 23, 1949 |